Oct. 27, 1931.  F. F. WAECHTER  1,829,317
LOADING AND UNLOADING MECHANISM FOR ELEVATORS
Filed May 14, 1927  7 Sheets-Sheet 1
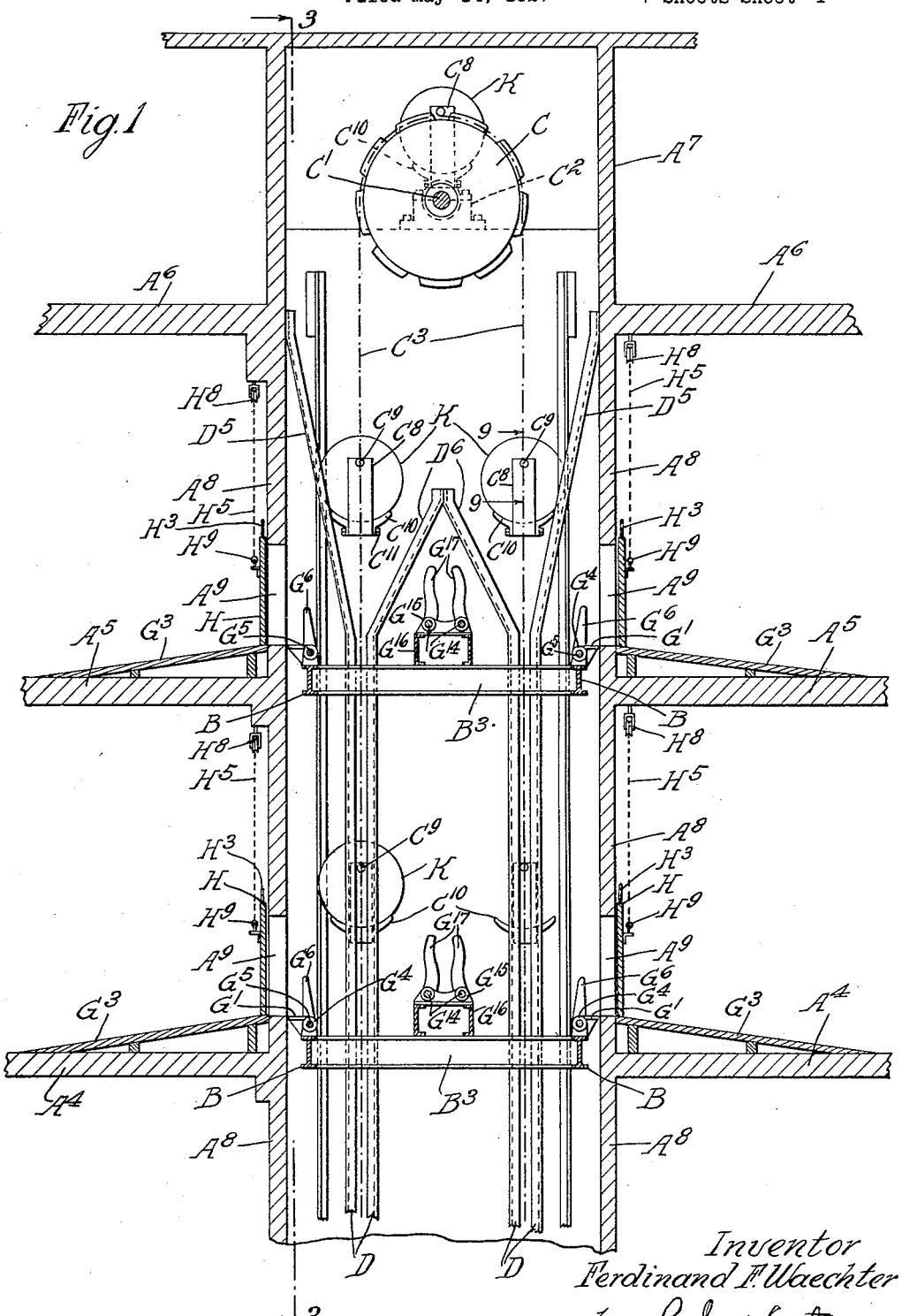
Inventor
Ferdinand F. Waechter
by Parker + Carter
Attorneys.

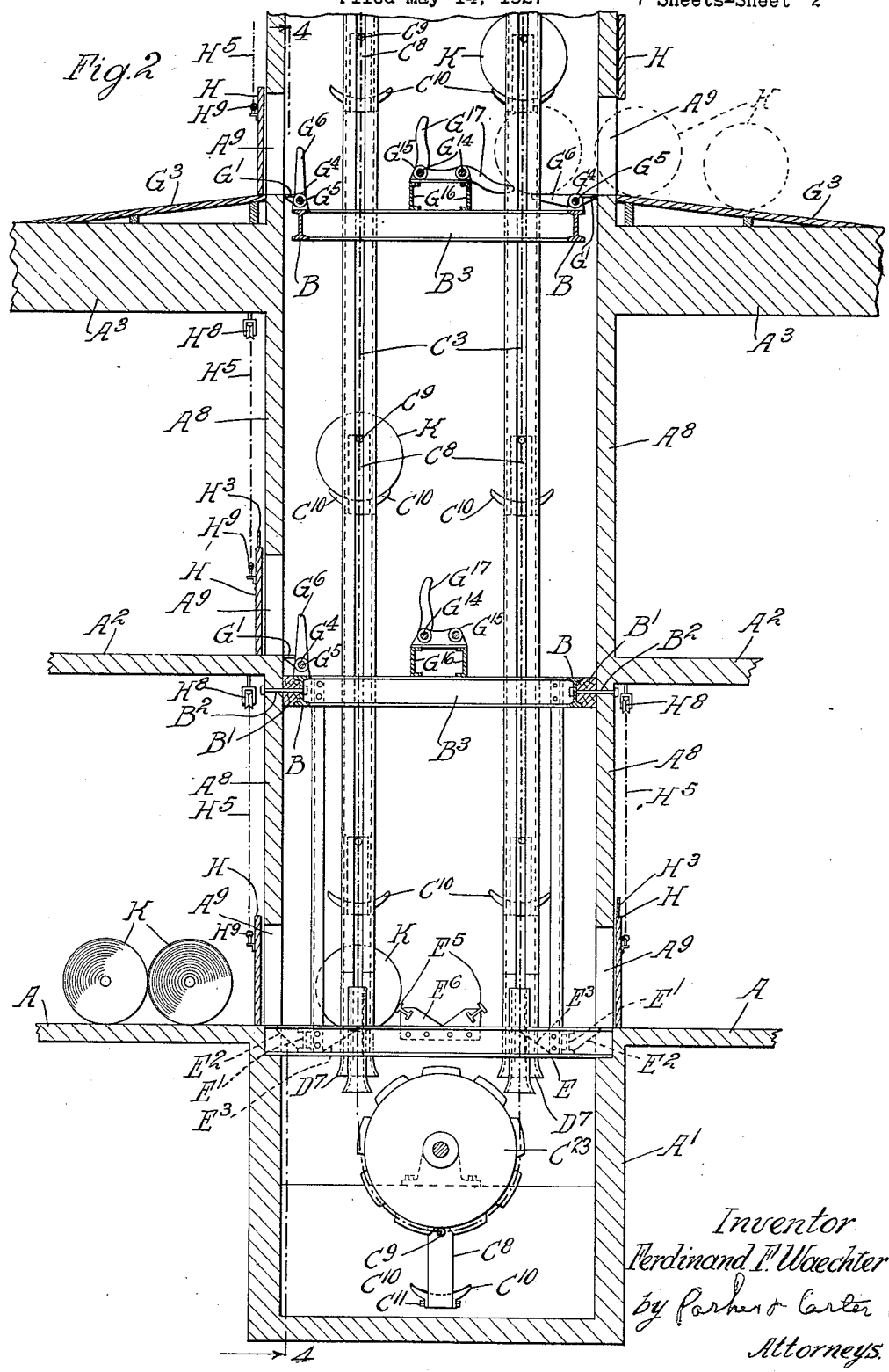

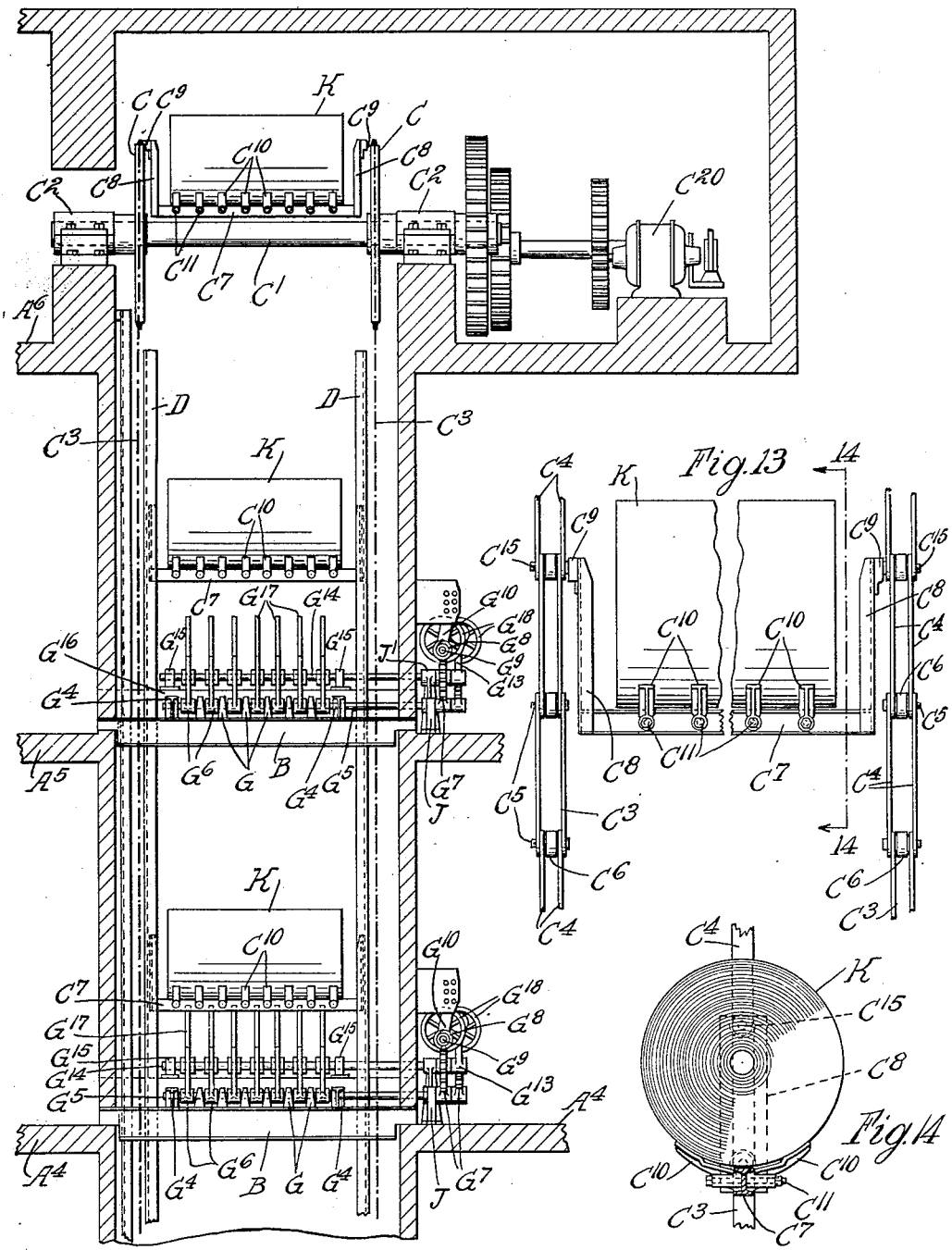

Oct. 27, 1931.  F. F. WAECHTER  1,829,317
LOADING AND UNLOADING MECHANISM FOR ELEVATORS
Filed May 14, 1927  7 Sheets-Sheet 4
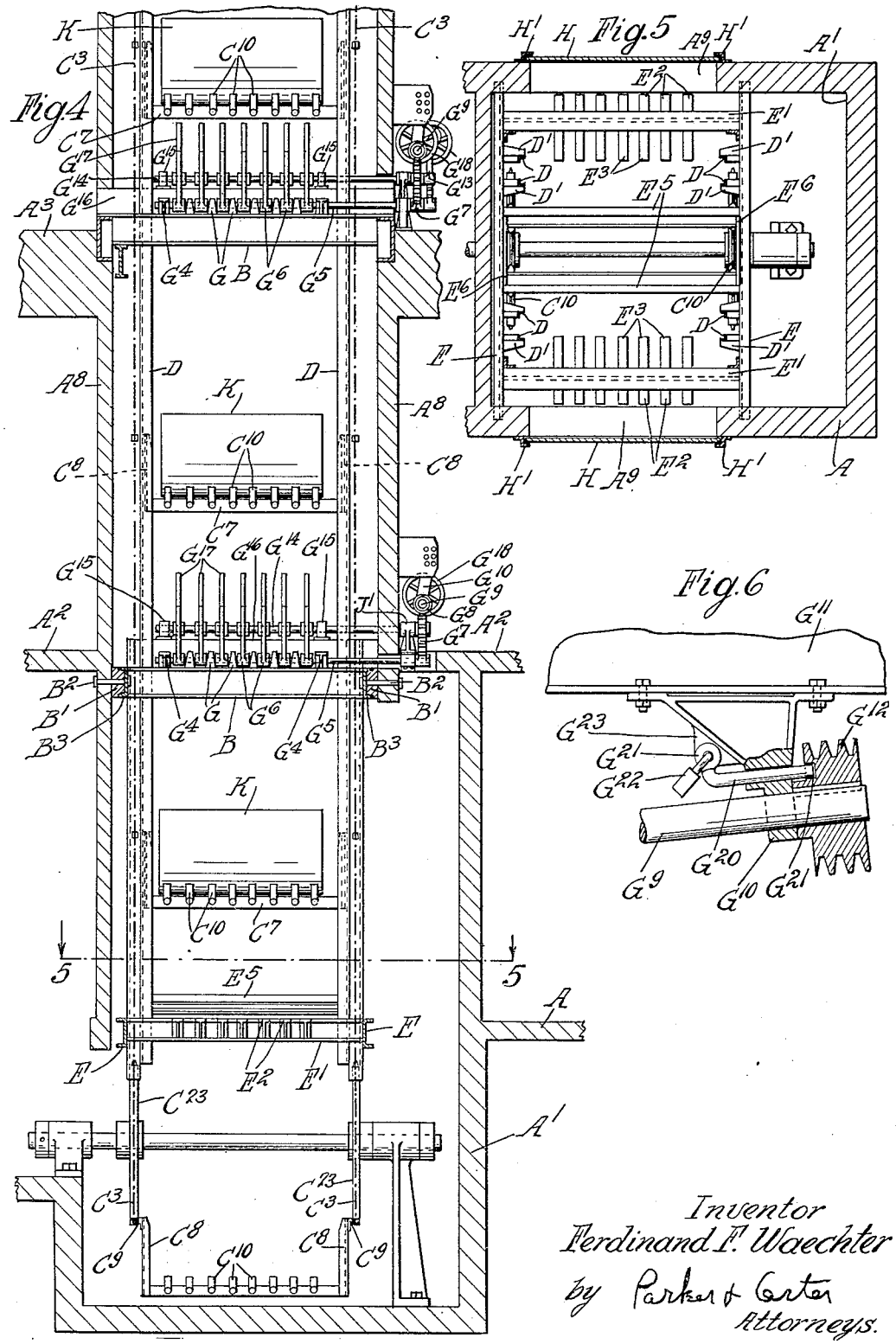

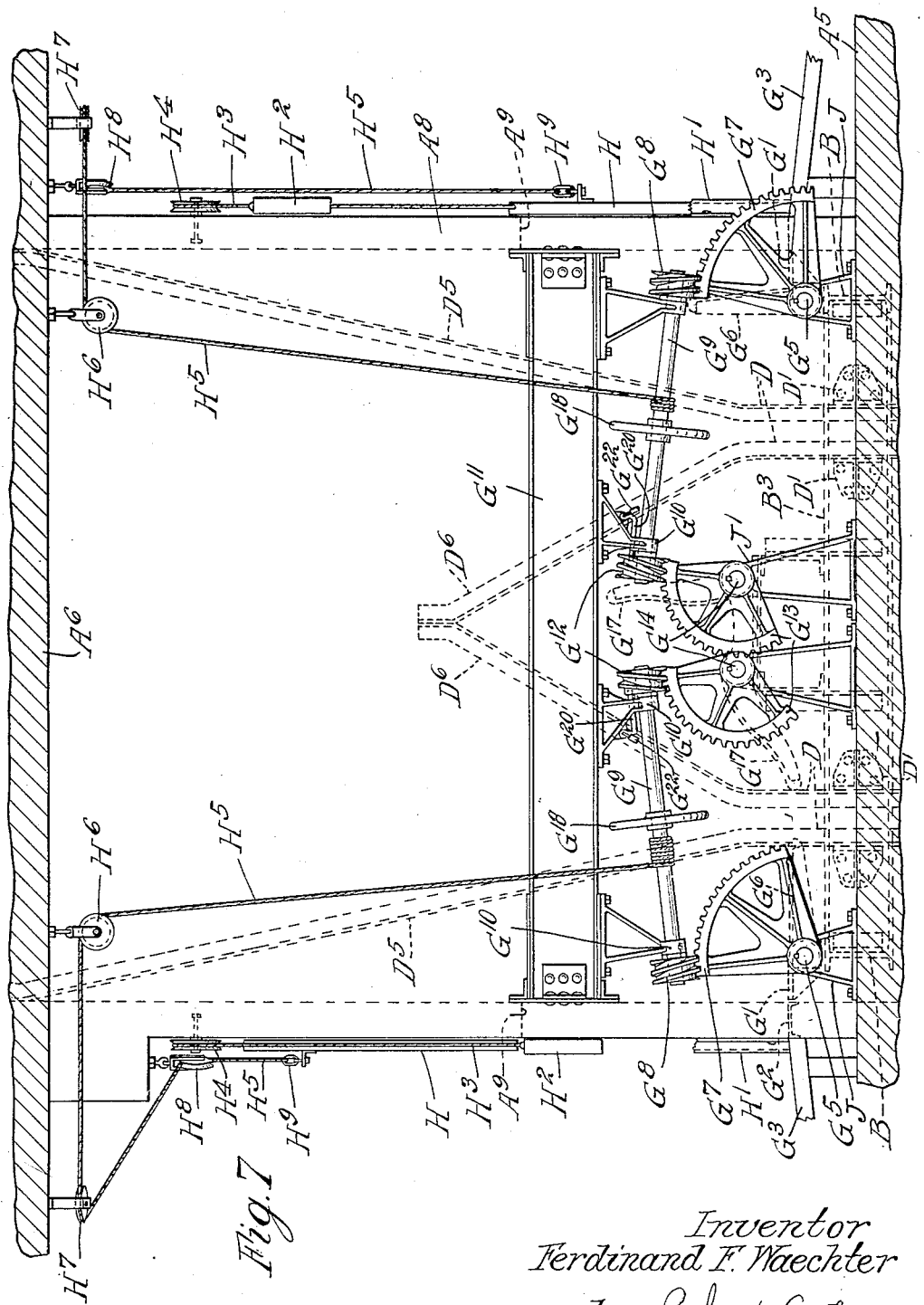

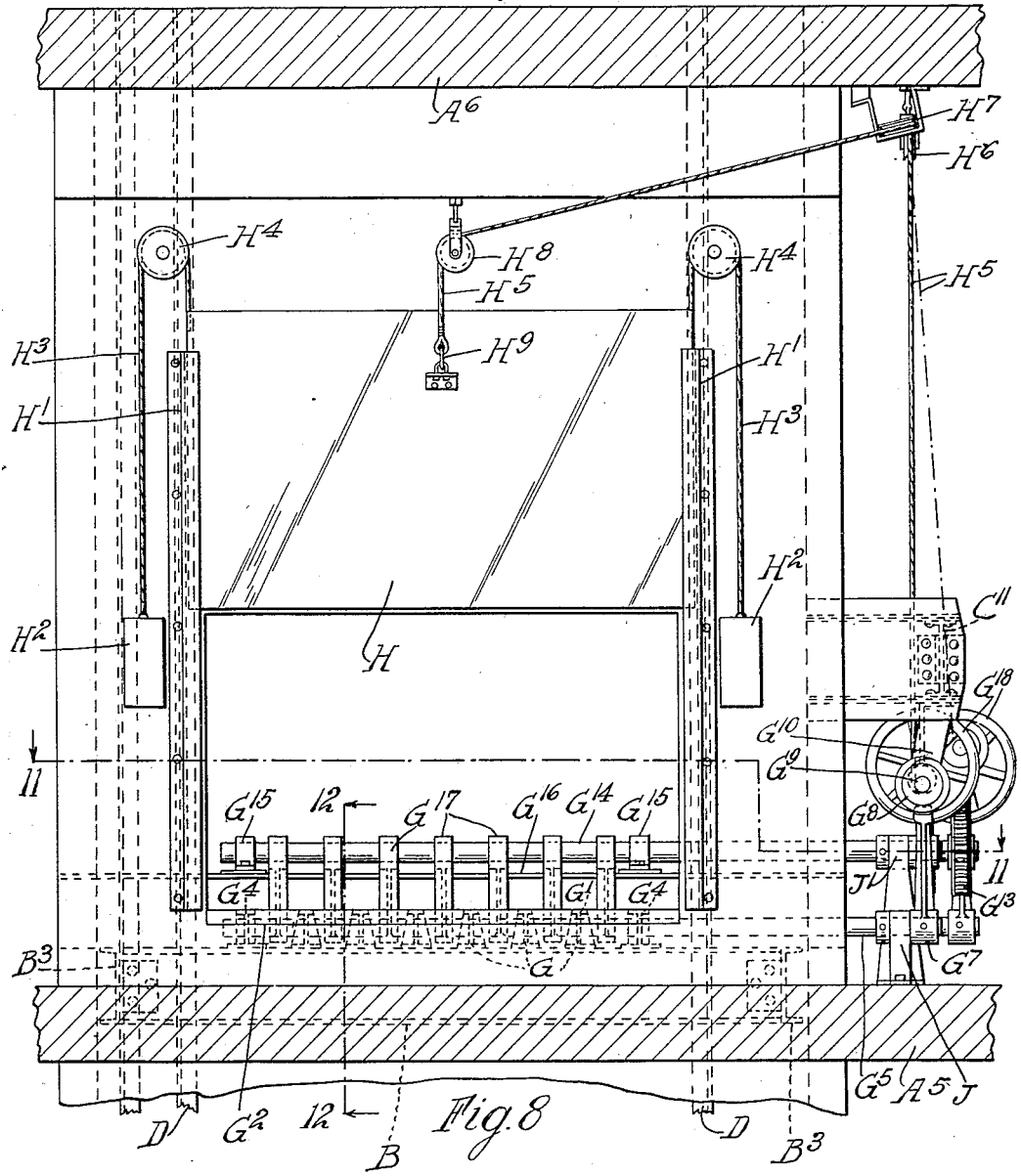
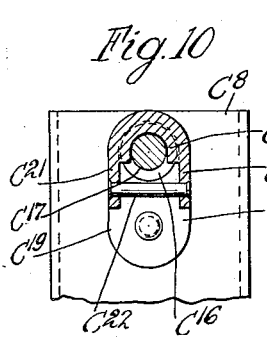
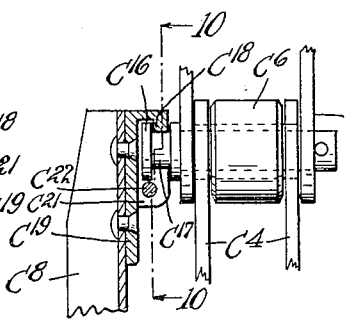

Oct. 27, 1931.   F. F. WAECHTER   1,829,317
LOADING AND UNLOADING MECHANISM FOR ELEVATORS
Filed May 14, 1927   7 Sheets-Sheet 7
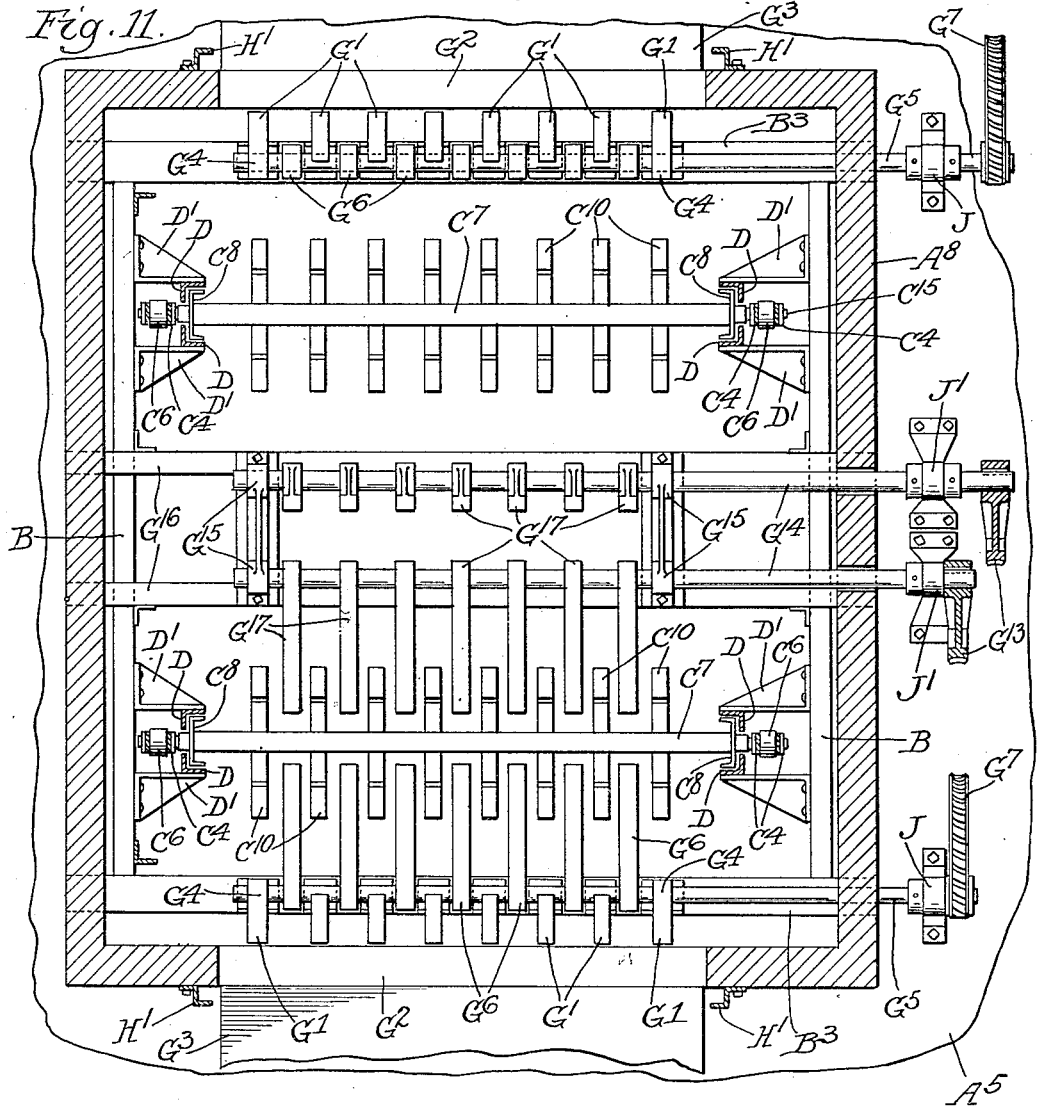
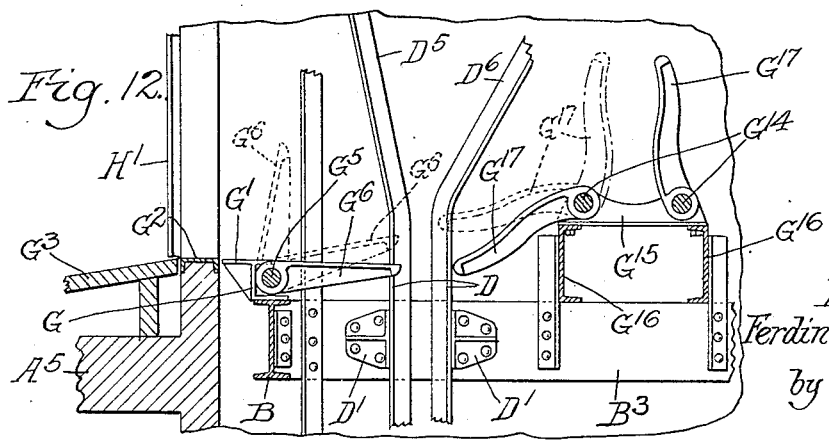
Inventor
Ferdinand F. Waechter
by Parker & Carter
Attorneys Patented Oct. 27, 1931

1,829,317

UNITED STATES PATENT OFFICE

FERDINAND F. WAECHTER, OF PHILADELPHIA, PENNSYLVANIA, ASSIGNOR TO LINK-BELT COMPANY, OF CHICAGO, ILLINOIS, A CORPORATION OF ILLINOIS

LOADING AND UNLOADING MECHANISM FOR ELEVATORS

Application filed May 14, 1927. Serial No. 191,507.

My invention relates to an elevator and has for one purpose the provision of means for handling heavy objects. My invention is herein shown, for purpose of illustration but not limitation, to the handling of heavy paper rolls in printing plants. An object of my invention is to provide an elevator or conveyor for heavy articles, whereby it is possible to handle such articles with maximum ease and speed. Another object is the provision of stations for such an elevator or conveyor, at which the articles may be delivered to or received from the elevator. Another object is the provision of gates or fire doors for said stations. Other objects will appear from time to time in the course of the specification and claims.

I illustrate my invention more or less diagrammatically in the accompanying drawings, in which Figure 1 is a vertical section through the upper portion of such elevator;

Figure 2 is a continuing vertical section through the lower portion of such an elevator;

Figure 3 is a vertical section on the line 3—3 of Figure 1;

Figure 4 is a vertical section on the line 4—4 of Figure 2;

Figure 5 is a section on the line 5—5 of Figure 4;

Figure 6 is a detail;

Figure 7 is a side view on an enlarged scale of the upper portion of the elevator;

Figure 8 is a front view of the portion of the elevator shown in Figure 7;

Figure 9 is a section on the line 9—9 of Figure 1;

Figure 10 is a section on the line 10—10 of Figure 9;

Figure 11 is a section on the line 11—11 of Figure 8;

Figure 12 is a section on the line 12—12 of Figure 8;

Figure 13 is a detailed view of the carrying member of the elevator; and

Figure 14 is a section on the line 14—14 of Figure 13.

Like parts are indicated by like symbols throughout the specification and drawings.

Referring first to Figures 1 and 2, A indicates the ground floor of a factory in which is sunk a well or pit $A^1$. $A^2$, $A^3$, $A^4$ and $A^5$ indicate intermediate floors. $A^6$ is the roof and $A^7$ the elevator superstructure thereof. $A^8$ indicates the walls of the elevator shaft penetrated by the gate apertures $A^9$.

Mounted within the shaft is any suitable supporting structure, herein shown as comprising I-beams B extending at both ends into the walls $A^8$ and also bolted to and through the supporting blocks $B^1$ by bolts $B^2$, which penetrate the walls $A^8$. $B^3$ indicate transverse channel irons or supports.

Supported in any suitable manner in the superstructure $A^7$ is the sprocket C, mounted, for example, upon the shaft $C^1$ in the bearings $C^2$ and driven from the electric motor $C^{20}$ as shown in Figure 3. Passing about the sprocket C is a conveyor chain $C^3$ shown in detail in Figure 13, which may consist of a plurality of flat link elements $C^4$ mounted in pairs and pivoted together, as by the pin $C^5$, with the intermediate roller or spacing members $C^6$ on said pins. At intervals along said chain are mounted cradles or carrying members, each including a transverse I-beam $C^7$ provided at each end with a supporting hanger $C^8$, which is pivoted at its upper end as at $C^9$ to the chain pivot pins $C^{15}$ having a head $C^{16}$, with a circular slot $C^{17}$ adapted to receive the semicircular flange $C^{18}$ of the member $C^{19}$ riveted to the supporting hangers $C^8$. $C^{22}$ is a locking pin riveted at both ends to the wings $C^{21}$ integral with the member $C^{19}$. Spaced along the beam $C^7$ are a plurality of pairs of fingers $C^{10}$, the fingers being arranged in pairs and being secured together to opposite sides of the member $C^7$, as by the bolts $C^{11}$.

D D indicate parallel guide or track members, herein shown as angle irons, secured to the transverse structural members $B^3$ by brackets $D^1$. The track members D D project inwardly in opposition and are separated by an interval sufficient to permit the passage of the member $C^{19}$. It will be observed from Figure 11 that the conveyor chain travels in the space between the angles D and bracket $D^1$, whereas the hanger member $C^8$ is confined or guided by the outer edges of the angles D, being on the opposite side of the angles D from the chain.

The chain is endless and any suitable sprocket $C^{23}$ may be positioned in the pit $A^1$. The angles or tracks D are flared or inclined away from each other at their upper ends as at $D^5$ $D^6$ in Figure 1. They are also slightly flared apart at their lower ends, as at $D^7$.

Referring to the lower portion of Figure 2, and assuming that the articles are to be delivered to the conveyor at the lower floor A, floor A is shown as flat. The articles may pass through the aperture $A^9$. A receiving or supporting structure is provided, which includes the transverse channel irons E, as shown in Figure 5, the ends of which are seated in the walls of the pit $A^1$. Transverse I-beams $E^1$ connect the beams E and have mounted therealong at opposite sides thereof the fixed parallel ribs $E^2$ $E^3$, the ribs $E^2$ extending toward the edge of the floor A and the ribs $E^3$ extending outwardly toward the center of the elevator shaft. It will be understood that ribs $E^3$ are so spaced, positioned and proportioned as to permit the passage therebetween of the ribs or fingers $C^{10}$ of the load-carrying members shown in detail in Figures 13 and 14. In operation articles may be pushed through the door $A^9$ and across the ribs $E^2$ and $E^3$. In order to limit their forward movement and to hold them in position to be received by the conveyor, I provide transverse stops comprising the I-beams $E^5$ $E^5$ shown at the bottom of Figure 2, which are mounted at each end upon any suitable supporting members $E^6$.

In the stations above the ground floor, viz: from floor $A^2$ on, it is necessary alternately either to permit the roll to pass, on its way to or from a station on a different level, or to intercept the movement of an article moving downwardly from another station, or to support a roll which is to be removed from the station in question. Therefore, in the place of the fixed ribs of the station just described, I provide adjustable ribs or fingers which may be moved into or out of the line of movement of the conveyor. While it will be realized that I might provide a wide variety of mechanisms to effect this result, I have developed a mechanism which is simple and efficient. Referring, for example, to Figures 11 and 12, I employ a plurality of members G, which may be mounted, for example, upon the I-beam B and which are provided with flat bars or fingers $G^1$ extending toward the sill $G^2$ of the gate $G^9$. $G^3$ is a ramp extending upwardly to the sill, which is positioned somewhat above the floor level. Mounted in bearings $G^4$ is a shaft $G^5$ which carries upon it a plurality of fingers $G^6$ adapted, when the shaft is at one limit of its rotation, to project upwardly into the inoperative position shown in dash and dot line in Figure 12. At the lowest position they lie in the load delivering position shown in full line in Figure 12. The intermediate dotted line position indicates the preferred position for receiving articles from the conveyor. At the outer end of the shaft $G^5$ is a segmental gear $G^7$ in mesh with a worm $G^8$ on the shaft $G^9$, which is mounted in bearings $G^{10}$ suspended from the transverse beam $G^{11}$. $G^{12}$ is a similar worm at the opposite end of the shaft $G^9$ in mesh with a segmental gear $G^{13}$ on the shaft $G^{14}$, which is mounted in bearings $G^{15}$ upon the transverse supporting frame members $G^{16}$. The shaft $G^{14}$ carries a plurality of fingers $G^{17}$ aligned with the fingers $G^6$. It will be understood that the fingers $G^6$ and $G^{17}$ are so shaped, formed and spaced as to permit the passage upwardly or downwardly therebetween, when they are in the inoperative position shown in dotted line in Figure 12, of the cradle or support $C^7$, and its load. $G^{18}$ is any suitable control wheel or member upon the shaft $G^9$, whereby the rotation of the shafts $G^5$ and $G^{14}$ may be effected. The worms $G^8$ and $G^{12}$ being opposite in pitch, the shafts rotate in opposition. J $J^1$ indicate additional bearings mounted upon the different floors for the shafts $G^5$ and $G^{14}$. Whereas I have described a single pair of shafts, it will be clear from Figures 7 and 11 that there is a duplication of stations at each floor, one station being adapted to receive from or deliver to one side of the shaft and the other from the other.

In order to control the delivery of articles to the various stations, and to reduce the fire hazard, I provide sliding doors H for each of the apertures $A^9$. The doors H move in suitable guides $H^1$, herein shown as Z irons bolted to the face of the elevator shaft. The raising and lowering of the doors is made easier by the employment of counter-weights $H^2$ connected by means of the cords or chains $H^3$ and sheaves $H^4$ with the gate top. The actual control of the gates is effected in response to rotation of the shaft $G^9$ through the flexible member $H^5$, which is secured at one end to the shaft $G^9$ and passes about the sheaves $H^6$, $H^7$ and $H^8$ to be secured to the top of the gate by means of the fuse link $H^9$. It will be realized that the link will fuse at a predetermined excess temperature and that when the link is fused the weight of the gate H is sufficient to overcome the counterweights $H^2$ and to close the gate.

Whereas I have shown a practical and operative device, it will be realized that many changes may be made in size, shape, number and disposition of parts. I therefore wish my description and drawings to be taken as illustrative and diagrammatic rather than as limiting me to my specific description and showing.

The use and operation of my invention are as follows:

In plants where large numbers of heavy objects are handled, the conveying problem becomes difficult. For example, in newspaper plants where large amounts of paper are used, the handling of the rolls in which the paper comes affords many difficulties. I have developed a mechanism for handling such rolls or other heavy objects, for raising them and lowering them from floor to floor, and for delivering them to the elevator or conveyor and for discharging them from such elevator and conveyor. My device includes an endless conveyor, which may be driven alternatively in either direction. To the conveyor links $C^4$ I pivot, at intervals along the chain, carriers $C^7$ with supporting ribs or fingers $C^{10}$ formed to engage and support the rolls K. As the carriers are pivoted to the conveyor, the articles may be received at a station on one side of the conveyor and may be carried upwardly above the sprocket C for delivery to a station on another side of the conveyor. The conveyor being reversible as to direction, I may employ any station of the entire series either as a delivery or as a receiving station. However, in the drawings herein I differentiate between the stations on the lower floor, the receiving floor and the stations on the upper floors, the particular form of my device herein shown having adjustable or movable receiving fingers only in the upper stations. Referring first to the lower stations, the fixed ribs or fingers $E^3$ project outwardly into the path of the conveyor. They do not interfere with the passage of the carrier itself, since the ribs or fingers of the carrier pass between the fixed fingers $E^3$, but they do prevent the passage of a roll or other article through the lower stations. In supplying a roll to the conveyor, it is rolled along the floor A, through the gate $A^9$, and upon the ribs $E^3$. The stop $E^5$ is so positioned as to hold the roll in proper position to be engaged by the carrier for conveyance to a higher station. If the direction of travel of the conveyor is reversed, and a loaded carrier cradle reaches the lower station, the roll engages the fixed fingers $E^3$ and its further movement is prevented, while the chain may continue its movement and withdraw the carrier from beneath the roll. The roll may then be removed outwardly through the gate $A^9$.

Referring to the upper stations, those which are intended for receiving articles are preferably provided with ramps $G^3$, in order to permit the ready withdrawal of the articles. It will be noted that the shafts $G^{14}$ are positioned higher than the shafts $G^5$ and that the fingers $G^{17}$ are downwardly curved or inclined towards the tips of the fingers $G^6$ when in lowest position. When the station is used as a delivery station a roll may be rolled upon the ramp $G^3$ and upon the fingers $G^6$, which, in lowest position, are inclined slightly downwardly toward the fingers $G^{17}$. The roll moves or is moved forward until it contacts the fingers $G^{17}$, which serve as a stop. The cradle or support may then be moved upwardly beneath the roll to engage and remove it. When a station is to be used as a receiving station, fingers are placed in the intermediate position shown in dotted line in Figure 12. As the cradle descends and the roll is lowered it is engaged first by the fingers $G^{17}$, which give it a kick-off to the left an cause it to roll down along the fingers $G^6$, through the door, and down the ramp $G^3$. The inclination of the fingers $G^6$ may be of itself sufficient to cause the paper roll K to roll, or the adjustment may be such as to permit easy manipulation by the operator.

When it is desired to permit an article to pass through a given station without stoppage, the fingers $G^6$ and $G^{17}$ are moved into the withdrawn position of Figure 1.

While I do not wish to limit myself to any particular proportioning or disposition of parts, the mechanism for setting the fingers, viz: the shaft $G^9$, worms $G^8$ and $G^{12}$, and the segments $G^7$ and $G^{13}$ in mesh therewith, may be so proportioned that one turn of the hand-wheel $G^{18}$ changes the position from loading to unloading. Six more turns may change it from the unloading to the passing position, and in any of these positions the fingers can be located or locked with a bolt or lock to prevent irresponsible tampering and the inevitable damage that may follow. I illustrate in Figure 6 a lock consisting of a pin $G^{20}$ which penetrates an aperture $G^{21}$ in the worm $G^{12}$, the pin $G^{20}$ being provided with an eye $G^{21}$ through which any suitable lock $G^{22}$ may be passed to lock it in relation to the flange $G^{23}$.

By connecting the gate H to the shaft $G^9$, I render the gate automatically responsive to the setting of the fingers. The flexible member or wire rope $H^5$, which actuates the fire door, will be completely raised in seven turns of the hand-wheel, thus bringing the fingers into the loading position from the passing position. The fire hazard being great in a plant handling paper, the fusible link is employed to permit the automatic closure of the gates with respect of the position of the fingers when a predetermined excess temperature is reached.

In the description herein I have disclosed an example of my device which is particularly applicable to the handling of rolls of material. It will be understood that I do not wish to be limited to the handling of rolls, but that the mechanism herein shown, in the form in which it is shown, or with slight modifications, can be employed for handling articles of various sizes, shapes and weights, such as boxes, bales and the like.

In the claims, where I employ the term

"loading position", I wish to mean that position of the loading and unloading unit in which the roll or other article is received by the unit from the conveyor. By "delivering position" I mean that position in which the fingers of such unit are positioned to support the article handled for delivery to the conveyor. By inoperative position is meant the position which permits the article conveyed to pass through a given station or unit without interference.

I claim:

1. In an elevator, a conveyor, a carrier member positioned on said conveyor, stations positioned along the line of movement of said conveyor, said stations including each a plurality of fingers projecting into the line of movement of said conveyor, the fingers being positioned to permit the carrier member to pass therethrough without contacting them, and means for moving the supporting fingers into and out of the path of movement of said carrier member, including a shaft upon which the supporting fingers are mounted, segmental gears associated with said shafts, worms in mesh with said gears and means for rotating said worms.

2. In an elevator, a conveyor, a carrier member positioned on said conveyor, stations positioned along the line of movement of said conveyor, said stations including each a plurality of fingers projecting from opposite sides into the line of movement of said conveyor, the fingers being positioned to permit the carrier member to pass therethrough without contacting them, and means for moving the supporting fingers into and out of the path of movement of said carrier member, including shafts upon which said supporting fingers are mounted, gears associated with said shafts, worms in mesh with said gears and means for rotating said worms in unison.

3. In an elevator, a conveyor, a carrier member positioned on said conveyor, stations positioned along the line of movement of said conveyor, said stations including each a plurality of fingers projecting into the line of movement of said conveyor, the fingers being positioned to permit the carrier member to pass therethrough without contacting them, and means for moving the supporting fingers into and out of the path of movement of said carrier member, including a shaft upon which the supporting fingers are mounted, segmental gears associated with said shafts, worms in mesh with said gears and means for rotating said worms, and means for locking said worms against rotation.

4. In an elevator system, an elevator shaft, a conveyor in said shaft, a supporting cradle positioned thereon, said cradle including a plurality of spaced supporting fingers, a station positioned in the line of movement of said conveyor, said shaft being provided with a gate in line with said station, said station including a pair of shafts pivoted at opposite sides of the conveyor, and a plurality of fingers positioned along said shafts and aligned with the spaces between the fingers on the hanger, means for operating the shafts to dispose the fingers in operative and in inoperative positions with respect to the cradle, and means interconnecting the gate and said shafts whereby to move the gate to open position when the fingers are moved to an operative position.

5. A loading and unloading unit for a generally vertical conveyor, comprising load engaging members positioned at opposite sides of said conveyor, means for moving said members into loading position, into delivering position, and into inoperative position, said means including gears controlling said members, a shaft, worms on said shaft in mesh with said gears, means for rotating said shaft, a gate associated with said unit and means for opening and closing it in conformity with changes in position of said members, including a flexible tension connection between said gate and said shaft, and means for locking said shaft against rotation.

6. In an elevator system, a conveyor including a plurality of laterally spaced chains, said chains being formed of a plurality of pivoted links, pivoted pins for said links, a supporting cradle positioned between said chains and pivoted upon said pivot pins, said pivot pins being headed, said cradle including socket members adapted partially to surround said heads.

7. In an elevator system, a conveyor including a plurality of laterally spaced chains, headed pins associated with said chains, a supporting cradle positioned between said chains and pivoted upon said pins, said cradle including socket members adapted partially to surround said heads.

8. In an elevator system an endless conveyor, a supporting cradle positioned thereon, said cradle including a plurality of spaced supporting fingers, a station positioned in the line of movement of said conveyor, said station including a receiving ramp downwardly and outwardly inclined from the path of the conveyor, and a pair of shafts pivoted at opposite sides of the conveyor, the shaft adjacent said ramp being lower than the shaft at the opposite side of the conveyor, a plurality of fingers positioned along said shafts and aligned with the spaces between the fingers on the cradle, means interconnecting said shafts for simultaneous predetermined relative movement, and means for selectively moving said shafts to dispose the fingers carried thereby inclined downwardly toward each other to form a loading pocket, or the fingers of the lower shaft inclined upwardly and those of the higher shaft inclined downwardly to define a downwardly inclined unloading ramp substantially alined with the receiving ramp.

9. In an elevator system an endless conveyor, a supporting cradle positioned thereon, said cradle including a plurality of spaced supporting fingers, a station positioned in the line of movement of said conveyor, said station including a receiving ramp downwardly and outwardly inclined from the path of the conveyor, and a pair of shafts pivoted at opposite sides of the conveyor, the shaft adjacent said ramp lying at a level substantially that of the edge of the ramp adjacent the conveyor, the shaft positioned at the opposite side of the conveyor lying at a higher level, a plurality of fingers positioned along said shafts and aligned with the spaces between the fingers on the cradle means interconnecting said shafts for simultaneous predetermined relative movement, and means for selectively moving said shafts to dispose the fingers carried thereby inclined downwardly toward each other to form a loading pocket, or the fingers of the lower shaft inclined upwardly and those of the higher shaft inclined downwardly to define a downwardly inclined unloading ramp substantially alined with the receiving ramp.

10. In an elevator system, an endless conveyor, a supporting cradle positioned thereon, said cradle including a plurality of spaced supporting members, a station positioned in the line of movement of said conveyor, a pair of parallel, generally horizontal shafts rotatably positioned at opposite sides of said conveyor, said shafts having a plurality of members thereon aligned with the spaces between the members on the cradle, the shaft on the receiving and discharging side of the station being at a lower level than the shaft on the opposite side, and a normally fixed receiving member positioned on said receiving and discharge side of the conveyor at substantially the level of said shaft means interconnecting said shafts for simultaneous predetermined relative movement, and means for selectively moving said shafts to dispose the fingers carried thereby inclined downwardly towards each other to form a loading pocket, or the fingers of the lower shaft inclined upwardly and those of the higher shaft inclined downwardly to define a downwardly inclined unloading ramp substantially alined with the receiving ramp.

11. In combination with an endless conveyor and a supporting cradle thereon, a loading and unloading station in the line of movement of said conveyor and cradle, said station including a pair of shafts at opposite sides of said conveyor, and spaced fingers on said shafts movable into the line of movement of the supporting cradle, the cradle including supporting members aligned with the spaces between said fingers, said shafts lying in horizontal generally parallel planes, the shaft on the receiving and discharge side of said station lying at a level lower than the shaft on the opposite side of said station, and means for unitarily rotating said shafts in opposite directions of rotation to selectively and cooperatively dispose said fingers in neutral, loading, and unloading positions, the fingers of the shaft on the receiving and discharge side of the station in loading position being downwardly and inwardly inclined toward the path of movement of the conveyor and in neutral position being out of the line of movement of the conveyor and being, in unloading position, downwardly and outwardly inclined away from the path of movement of the conveyor and toward the receiving and discharge side of the station.

12. In combination with an endless conveyor and a supporting cradle thereon, a loading and unloading station in the line of movement of said conveyor and cradle, said station including a pair of shafts at opposite sides of said conveyor, and spaced fingers on said shafts movable into the line of movement of the supporting cradle, the cradle including supporting members aligned with the spaces between said fingers, said shafts lying in horizontal generally parallel planes, the shaft on the receiving and discharge side of said station lying at a level lower than the shaft on the opposite side of said station, and means for unitarily rotating said shafts in opposite directions of rotation to selectively and cooperatively dispose said fingers in neutral, loading, and unloading positions, the fingers of the shaft on the receiving and discharge side of the station loading position being downwardly and inwardly inclined toward the path of movement of the conveyor and in neutral position being out of the line of movement of the conveyor and being, in unloading position, downwardly and outwardly inclined away from the path of movement of the conveyor and toward the receiving and discharge side of the station, the fingers of the opposite shaft being inclined downwardly toward the receiving and discharge side of the station when the fingers on the receiving and discharge side are inclined downwardly and inwardly toward the path of movement of the conveyor.

13. In an elevator system, an endless conveyor, an article support carried thereby, and means for loading articles onto the article support and unloading articles therefrom comprising a pair of shafts, one mounted on each side of the path of travel of the conveyor, cooperative load engaging members carried by said shafts and arranged for movement into and out of the path of travel of the article support for loading and unloading operations, said shafts being mounted in fixed bearings and at different elevations, the shaft on the inside of the conveyor being at higher elevation, said shafts being mechanically interconnected to move the load engaging members to predetermined positions, and means for selectively moving the shafts simultaneously to cooperatively dispose the load engaging members to form a depressed loading pocket, a downwardly and outwardly inclined ramp, or to dispose the members in a neutral position.

14. In an elevator system, an elevator shaft, an endless conveyor movable therein, a load handling station in the shaft and including load engaging and supporting means movable into and out of operative relation with respect to the conveyor, the shaft adjacent the station being apertured, a gate controlling the aperture, and operating mechanism interconnecting the gate and load engaging means whereby to simultaneously open the gate and operatively position the load engaging means and to close the gate and move the load engaging means to an inoperative position.

Signed at Philadelphia, county of Philadelphia and State of Pennsylvania, this 16th day of April, 1927.

FERDINAND F. WAECHTER.